(12) United States Patent
Steinmeyer et al.

(10) Patent No.: US 11,935,250 B2
(45) Date of Patent: Mar. 19, 2024

(54) METHOD, DEVICE AND COMPUTER-READABLE STORAGE MEDIUM WITH INSTRUCTIONS FOR PROCESSING SENSOR DATA

(71) Applicant: Volkswagen Aktiengesellschaft, Wolfsburg (DE)

(72) Inventors: Simon Steinmeyer, Braunschweig (DE); Marek Musial, Berlin (DE); Carsten Deeg, Berlin (DE); Thorsten Bagdonat, Braunschweig (DE); Thorsten Graf, Gifhorn (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 751 days.

(21) Appl. No.: 17/048,701

(22) PCT Filed: Mar. 27, 2019

(86) PCT No.: PCT/EP2019/057701
§ 371 (c)(1),
(2) Date: Oct. 19, 2020

(87) PCT Pub. No.: WO2019/201565
PCT Pub. Date: Oct. 24, 2019

(65) Prior Publication Data
US 2021/0158544 A1 May 27, 2021

(30) Foreign Application Priority Data
Apr. 18, 2018 (DE) .................... 10 2018 205 879.2

(51) Int. Cl.
*G06T 7/269* (2017.01)
*G01S 13/86* (2006.01)
*G01S 13/931* (2020.01)

(52) U.S. Cl.
CPC ............ *G06T 7/269* (2017.01); *G01S 13/867* (2013.01); *G01S 13/931* (2013.01);
(Continued)

(58) Field of Classification Search
CPC ..... G01S 13/867; G01S 13/931; G06T 7/269; G06T 2207/10016; G06T 2207/10028;
(Continued)

(56) References Cited

U.S. PATENT DOCUMENTS 8,704,887 B2 4/2014 Zeng et al. .................... 348/135
9,255,989 B2 2/2016 Joshi et al.
(Continued)

FOREIGN PATENT DOCUMENTS

DE 102011013776 A1 11/2011 ................ G06K 9/62
DE 102011119767 A1 6/2012 ............. B60W 40/02
(Continued)

OTHER PUBLICATIONS

Matzka, Stephen et al., "Efficient Resource Allocation for Attentive Automotive Vision Systems," IEEE Transactions on Intelligent Transportation Systems, vol. 13, No. 2, pp. 859-872, Jun. 2012.
(Continued)

*Primary Examiner* — Katrina R Fujita
(74) *Attorney, Agent, or Firm* — Slayden Grubert Beard PLLC

(57) ABSTRACT

A method, a device and a computer-readable storage medium with instructions for processing sensor data. In a first step, camera images are taken by a camera. Additionally, 3D-checkpoints are detected by at least one 3D-sensor. Optionally, at least one of the camera images can be segmented. The camera images are then merged with the 3D-checkpoints by a data fusion circuit to form data of a virtual sensor. The resulting data are finally output for further processing.

17 Claims, 5 Drawing Sheets

(52) U.S. Cl.
CPC .............. *G06T 2207/10028* (2013.01); *G06T 2207/20084* (2013.01); *G06T 2207/30252* (2013.01)

(58) Field of Classification Search
CPC . G06T 2207/20072; G06T 2207/20084; G06T 2207/20221; G06T 2207/30252
See application file for complete search history.

(56) References Cited

U.S. PATENT DOCUMENTS

| | | | |
|---|---|---|---|
| 2015/0336547 A1* | 11/2015 | Dagan | G06V 20/58 701/70 |
| 2016/0209236 A1* | 7/2016 | Steinhardt | G01C 25/005 |
| 2017/0147888 A1 | 5/2017 | Zeng | 342/52 |
| 2017/0206426 A1 | 7/2017 | Schrier et al. | |
| 2017/0242442 A1* | 8/2017 | Minster | G06T 7/32 |
| 2018/0364717 A1* | 12/2018 | Douillard | G01S 17/58 |
| 2019/0156485 A1* | 5/2019 | Pfeiffer | G05D 1/0253 |
| 2019/0180502 A1* | 6/2019 | England | G01S 7/417 |
| 2019/0235521 A1* | 8/2019 | Mudalige | G05D 1/0248 |
| 2019/0294176 A1* | 9/2019 | Ozbilgin | G06V 10/803 |

FOREIGN PATENT DOCUMENTS

| | | | |
|---|---|---|---|
| DE | 102013107861 A1 | 1/2014 | ............ G01C 21/30 |
| DE | 102012023030 A1 | 5/2014 | ............ G01B 11/24 |
| DE | 102016122190 A1 | 5/2017 | ............ G06K 9/62 |
| DE | 102017100199 A1 | 9/2017 | ............ B60W 30/08 |
| DE | 2019/201565 A1 | 10/2019 | ............ G06T 7/269 |
| DE | 102018205879 A1 | 10/2019 | ............ B60W 30/08 |

OTHER PUBLICATIONS

Garcia, Fernando et al., "Data Fusion for Overtaking Vehicle Detection Based on Radar and Optical Flow," 2012 Intelligent Vehicles Symposium, pp. 494-499, Jun. 3, 2012.
Gruyer, Dominique et al., "Vehicle Detection and Tracking by Collaborative Fusion between Laser Scanner and Camera," 2013 IEEE/RSJ International Conference on Intelligent Robots and Systems (IROS), pp. 5207-5214, Nov. 3, 2013.
German Office Action, Application No. 102018205879.2, 7 pages, dated Apr. 16, 2019.
International Search Report and Written Opinion, Application No. PCT/EP2019/057701, 20 pages, dated May 29, 2019.

* cited by examiner

METHOD, DEVICE AND COMPUTER-READABLE STORAGE MEDIUM WITH INSTRUCTIONS FOR PROCESSING SENSOR DATA

CROSS-REFERENCE TO RELATED APPLICATIONS

This application claims priority to German Patent Application No. DE 10 2018 205 879.2, filed Apr. 18, 2018. The contents of the aforesaid Patent Application are incorporated herein for all purposes.

TECHNICAL FIELD

The present invention relates to a method, a device and a computer-readable storage medium with instructions for processing sensor data. The invention further relates to a motor vehicle in which a method according to the invention or a device according to the invention is used.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern motor vehicles to date already have a large number of sensors for various level 2 assistance systems (partially automated systems).

For level 3 and higher systems (highly automated and autonomous systems) the number of sensors installed will continue to increase. For safety reasons, there will be redundant detection areas which are covered by several sensors with different measuring principles.

Camera sensors, radar scanners and laser scanners play the most important role here. In particular, it can be assumed that at least one camera sensor and one 3D-sensor are present in critical areas to cover them. Examples of 3D-sensors are laser scanners or a radar sensor with elevation measurement.

In classic systems there exists a so-called object tracking, which sets up object hypotheses which are confirmed and updated by new sensor measurements. Traditionally, so-called "predictor-corrector filters", such as a Kalman filter, are used. When a new measurement arises, all objects are predicted to the measurement time of the new measurement using a dynamic model. Subsequently, an attempt is made to assign the measurement to an existing object. If this succeeds, the track will be updated. If this fails, a new object hypothesis is set up, i.e., a new track.

In classic object tracking, a number of challenges must be taken into account, especially in the association step, so that ambiguities are avoided. For example, the dynamic state cannot always be estimated well: Depending on the measurements and the state of a track, a Cartesian velocity vector is often not known.

An acceleration can only be estimated through longer observation. This can lead to large errors in the prediction step. In addition, an object can behave contrary to the dynamic model, e.g., by sudden braking. This deviating behavior can also lead to prediction errors.

In addition, there are often systematic measurement errors between different sensors: A laser scanner detects e.g. highly reflective surfaces very well, such as license plates or cat's eyes, while vehicles painted black are difficult to detect. Radar sensors, on the other hand, detect metallic objects with a large radar cross-section well, such as rear lights, kinked metal sheets, etc. In this connection, different points of an object are detected by the sensors then, which may be far away from one another but are assigned to the same object. In addition, some sensors, e.g. Radar sensors, exhibit a comparatively low selectivity, so that the ambiguity problem is exacerbated here.

Incorrect handling of ambiguities can lead to incorrect associations, in which object tracks are associated and updated with incorrect measurement data. This can have unpleasant consequences. For example, a lateral speed can be wrongly assigned to a peripheral building. Thereupon, the peripheral building appears dynamic and moves into the driving envelope. This can cause an emergency stop due to a "ghost object". It also may happen that a peripheral building, e.g., a traffic bollard measured by means of a laser scanner, is assigned to a nearby dynamic object, e.g., a vehicle that is just passing the traffic bollard. This prevents the traffic bollard from being recognized as such in time, which can lead to a collision with the peripheral building.

SUMMARY

An object exists to provide solutions for processing of sensor data enabling to reduce problems that occur during object tracking.

The object is solved by a method and by a device according to the respective independent claims. Embodiments of the invention are discussed in the dependent claims and the following description.

The details of one or more embodiments are set forth in the accompanying drawings and the description below. Other features will be apparent from the description, drawings, and from the claims.

DESCRIPTION

Figure 1:
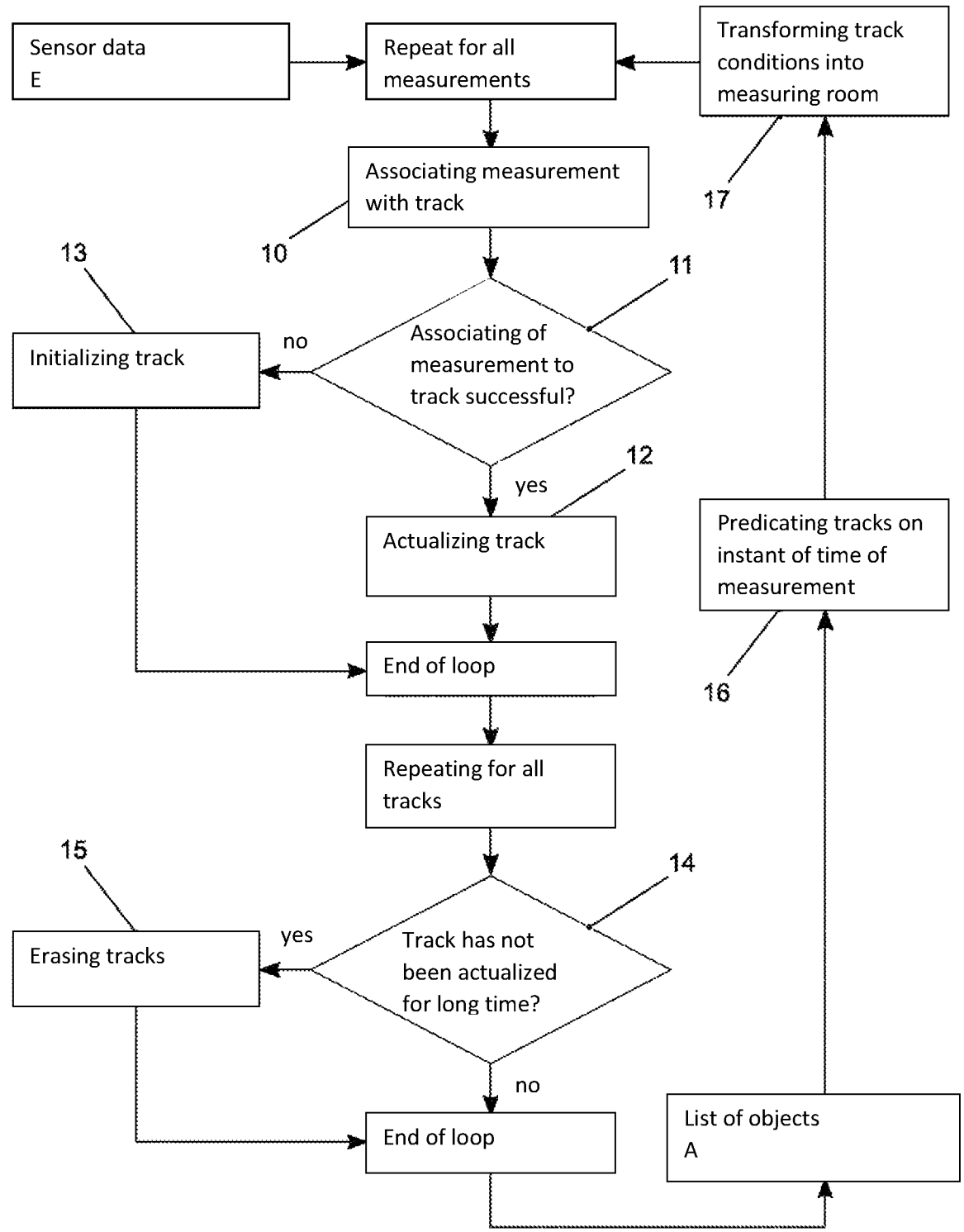
FIG. 1 shows schematically an exemplary sequence of a classic object tracking.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method for processing sensor data comprises the steps:
  obtaining/taking camera images by a camera;
  detecting 3D-checkpoints by at least one 3D-sensor; and
  merging the camera images with the 3D-checkpoints to form data of a virtual sensor.

In another exemplary aspect, a computer-readable storage medium contains instructions which, when executed by a computer, cause the computer to carry out the following steps for processing sensor data:
  obtaining/taking camera images by a camera;
  detecting 3D-checkpoints by at least one 3D sensor; and
  merging the camera images with the 3D-checkpoints to form data of a virtual sensor.

Herein, the term computer is to be understood broadly. In particular, it also includes control devices and other processor-based data processing devices.

In another exemplary aspect, a device for processing sensor data comprises:
an input for receiving camera images from a camera and from 3D-checkpoints from a 3D-sensor; and
  a data fusion circuit for merging the camera images with the 3D-checkpoints to form data of a virtual sensor.

The concept of a virtual sensor is introduced as part of a preprocessing step for the evaluation of sensor data, in particular in the context of object tracking. This merges the measurement data of the camera and 3D-sensors on an earlier measurement point level and thus abstracts the individual sensors. During the subsequent object tracking the resulting data from the virtual sensor may be clustered into object hypotheses with high quality, as they contain extensive information in order to separate different classes. The solution according to the present teachings prevents the object hypotheses of different sensors with systematic errors per time from being merged in a common model, with association errors easily occurring. This enables a robust perception of the surroundings, which allows highly automated and autonomous driving functions.

In some embodiments, the merging of the image data with the 3D-checkpoints to form data of a virtual sensor comprises:
  calculating an optical flow from at least a first camera image and a second camera image; and
  determining in at least one of the camera images and on the basis of the optical flow pixels to be assigned to one of the 3D-checkpoints at an instant of time of the measurement.

By using the calculated optical flow, the 3D-checkpoints are synchronized with the camera images. This is particularly beneficial because the optical flow automatically correctly takes into account external and internal movements. There is no dynamic model stored which could induce errors.

In some embodiments, the determination of pixels in at least one of the camera images to be assigned to one of the 3D-checkpoints at an instant of time of the measurement comprises:
  converting a camera image in temporal vicinity of an instant of time measurement of the 3D-sensor on basis of the optical flow; and
  projecting the 3D-checkpoints into the converted camera image.

With help of the optical flow, the entire camera image can be converted into the instant of time of the measurement of the 3D-sensor. Subsequently, 3D-checkpoints can be projected from the depth-measuring sensor into the camera image. For this purpose, the pixels can be treated, for example, as infinitely long rays that intersect with the 3D-checkpoints.

In some embodiments, determining in at least one of the camera images pixels to be assigned to one of the 3D-checkpoints at an instant of time of the measurement comprises:
  determining, on the basis of the optical flow and a search method, those pixels in the camera image which are to be assigned to the 3D-checkpoints at the instant of time of the measurement; and
  projecting the 3D-checkpoints at the points determined in this way in the camera image.

With the help of the optical flow and a search method, it is possible to determine those pixels in the camera image that are to be assigned to the 3D-measurement points at the instant of time of the measurement. This is particularly useful in a LIDAR system, where each measuring point has its own time stamp due to the scanning effect. The approach based on a search method is significantly less expensive with regard to computing than converting the entire image for each measuring point.

In some embodiments, from the optical flow a time to collision is determined for the pixels of the camera images. Then a Cartesian velocity vector for a 3D-checkpoint can be calculated from the time to collision, the optical flow and a distance measurement for this 3D-checkpoint. This can be used, for example, to differentiate between overlapping objects of a same class. For such a differentiation previous sensors had to track objects over time using dynamic models and association models, which is relatively susceptible for errors.

In some embodiments, a time to collision is determined by a 3D-measurement from a radial relative speed and a distance measurement. Then for this 3D-checkpoint a Cartesian velocity vector can be calculated from the time to collision and the optical flow. This approach has the benefit that, if the radial relative speed derives from a radar sensor for example, the measurement of the time to collision is particularly accurate. Additionally, horizontal as well as vertical object movements in the image (optical flow) can be observed very precisely. The resulting velocity vector is therefore generally more precise than if the time to collision is estimated from the image alone.

In some embodiments, the 3D-checkpoints are expanded to include attributes from at least one of the camera images. The attributes can be, for example, the (averaged) optical flow or the position in the image space of the associated pixel or of the associated pixels from the camera image. Likewise, the speed vector, a Doppler speed, the reflectivity and, respectively, the radar cross section or the confidence can be added. The additional attributes allow a more robust object tracking or better segmentation to be implemented.

In some embodiments, a camera image is segmented near an instant of time of the 3D-measurement. Optionally, before segmentation measurement points of the 3D-sensor are projected precisely into the image by means of the optical flow and their measurement attributes are stored in further dimensions. This enables cross-sensor segmentation.

The segmentation is for example carried out by a neural network. On the one hand, the segmentation avoids association errors and, on the other hand, ambiguities between two classes can be resolved. Class information and identifiers, respectively, resulting from the segmentation are for example also added as attributes to the 3D-checkpoints.

In some embodiments, an algorithm for object tracking is applied to the data of the virtual sensor. This algorithm e.g. performs an accumulating sensor data fusion. The accumulating sensor data fusion enables filtering of the data over time and therefore reliable object tracking.

In some embodiments, the method according to the preceding discussion or a device according to the preceding discussion is used in a vehicle, in particular a motor vehicle.

Further features of the present invention will become apparent from the following description and the appended claims in conjunction with the FIGS.

For a better understanding of the principles of the present invention, further embodiments are explained in more detail below with reference to the FIGS. The invention is not restricted to these embodiments and the features described may also be combined or modified without departing from the scope of the invention as defined in the appended claims.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 schematically shows the sequence of a classic object tracking. Input variables for the object tracking are sensor data E and track states transformed into the measurement space. In a first step 10, an attempt is made to associate a measurement with a track. Thereafter, a check 11 is performed whether the association was successful. If this is the case, the corresponding track is updated 12. However, if the association fails, a new track is initialized 13. This procedure is repeated for all measurements. Furthermore, a check 14 is performed for all tracks it the respective track has not been updated for a long time. Tracks for which this is affirmed are deleted 15. The output quantity of the object tracking is an object list A. The associated tracks are predicted 16 for the next instant of time of measurement and the resulting track states are in turn transformed 17 into the measurement space for the next run of the object tracking.

Figure 2:
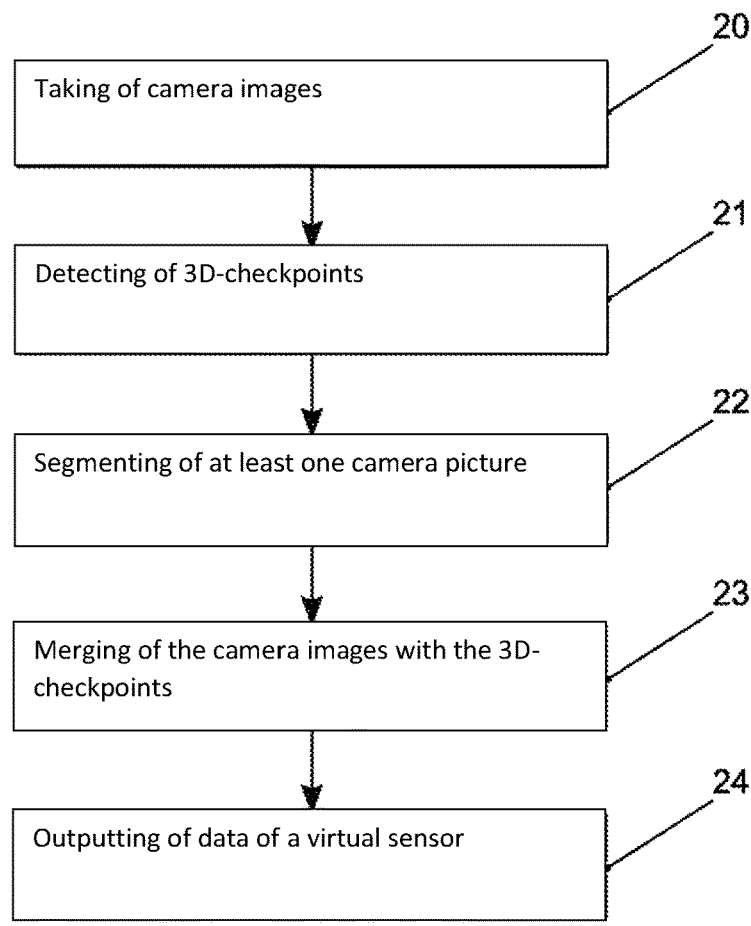
FIG. 2 schematically shows an exemplary method for processing sensor data.

FIG. 2 schematically shows a method for processing sensor data. In a first step, camera images are recorded 20. 3D-checkpoints are also recorded by at least one 3D-sensor 21. Optionally, at least one of the camera images can be segmented 22, e.g. through a neural network. The camera images are then fused 23 with the 3D-checkpoints by a data fusion circuit to form data of a virtual sensor. Here, an optical flow is determined which is used to synchronize image points and 3D-checkpoints. The 3D-checkpoints can be expanded to include attributes from at least one of the camera images. The resulting data are finally output 24 for further processing. During further processing, for example, an algorithm for object tracking can be applied to the data of the virtual sensor. The algorithm can, e.g., perform an accumulating sensor data fusion. In addition, the data from the virtual sensor can be segmented. The segmentation can in turn be carried out by a neural network.

Figure 3:
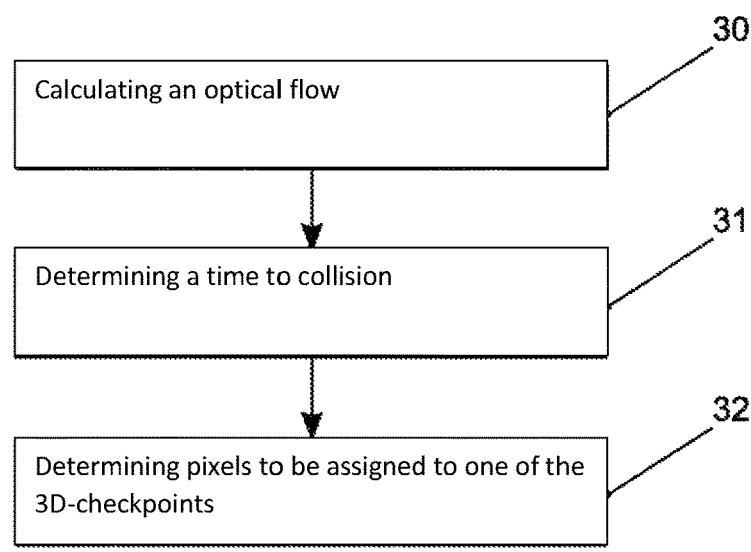
FIG. 3 shows schematically an exemplary merging of camera images with 3D-checkpoints to form data from a virtual sensor.

FIG. 3 schematically shows the merging of camera images with 3D-checkpoints to form data of a virtual sensor. In a first step 30, an optical flow is calculated from at least a first camera image and a second camera image. A time to collision can optionally be determined 31 from the optical flow for the pixels of the camera images. From the time to collision, the optical flow and a distance measurement for a 3D-checkpoint a speed vector can also be calculated for this 3D-checkpoint. Alternatively, a time to collision can be determined from a 3D-measurement from a radial relative speed and a distance measurement. Thereupon, for this 3D-checkpoint a Cartesian velocity vector can be calculated from the time to collision and the optical flow. Finally, on the basis of the optical flow pixels are determined 32 in at least one of the camera images that are assigned to one of the 3D-checkpoints. To this end, a camera image in temporal proximity of a measurement time of the 3D-sensor can first be converted on basis of the optical flow. The 3D-checkpoints can then be projected into the converted camera image.

Figure 4:
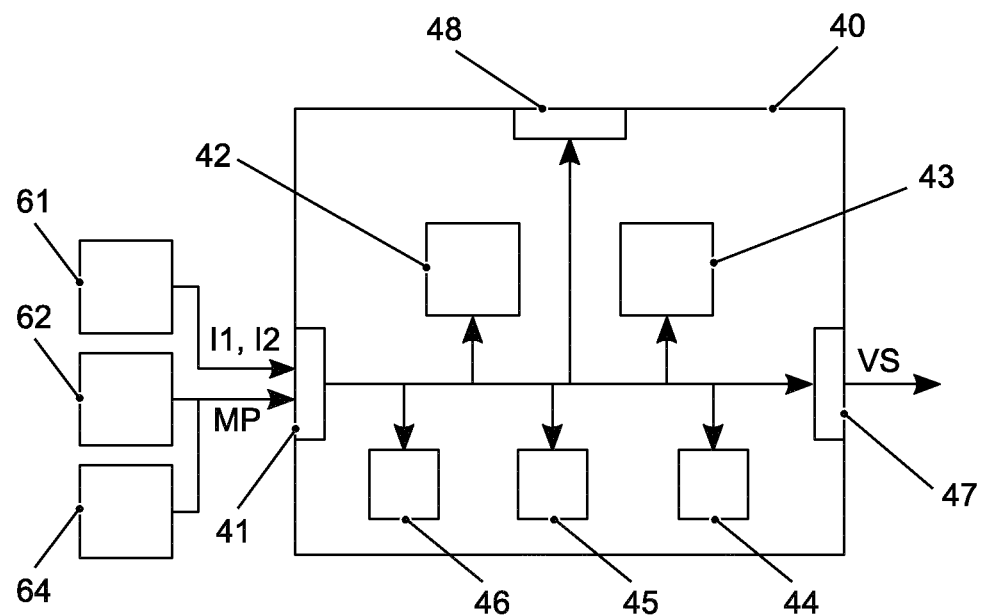
FIG. 4 shows a first embodiment of a device for processing sensor data.

FIG. 4 shows a simplified schematic illustration of a first embodiment of a device 40 for processing sensor data. The device 40 has an input 41 via which camera images I1, I2 from a camera 61 and 3D-checkpoints MP from at least one 3D-sensor 62, 64 can be received. The device 40 also optionally has a segmenting device 42 for segmenting at least one camera image and, respectively, a camera image I1, I2 enriched with further measurements, e.g. by means of a neural network. The camera images I1, I2 are merged with the 3D-checkpoints MP by a data fusion circuit 43 to form data VS of a virtual sensor. The 3D-checkpoints MP can be expanded to include attributes from at least one of the camera images I1, I2. For the merging, in a first step the data fusion circuit 43 can calculate an optical flow from at least a first camera image I1 and a second camera image I2. Optionally, a time to collision for the pixels of the camera images I1, I2 can be determined from the optical flow. A speed vector for this 3D-checkpoint MP can then be calculated from the time to collision, the optical flow and a distance measurement for a given 3D-checkpoint MP. Alternatively, a time to collision can be determined from a 3D-measurement from a radial relative speed and a distance measurement. Thereafter, a Cartesian speed vector for this 3D-checkpoint MP can be calculated from the time to collision and the optical flow. On the basis of the optical flow, the data fusion circuit 43 finally determines pixels in at least one of the camera images I1, I2 that are assigned to one of the 3D-checkpoints MP. For this purpose, a camera image I1, I2 in the temporal proximity of a measurement time MP of the 3D-sensor 62, 64 can first be converted on basis of the optical flow. The 3D-checkpoints MP can then be projected into the converted camera image.

A likewise optional object tracker 44 can carry out object tracking on basis of the data VS from the virtual sensor. The object tracker 44 can e.g. perform an accumulating sensor data fusion. However, this can also be carried out outside the device 40. The data VS of the virtual sensor or the results of the object tracking or segmentation are output via an output 47 of the device 40 for further processing.

The segmenting device 42, the data fusion circuit 43 and the object tracker 44 can be controlled by a control unit 45. Settings of the segmenting device 42, the data fusion circuit 43, the object tracker 44 or the control unit 45 can optionally be changed via a user interface 48. Data obtained in the device 40 can be stored in a memory 46 of the device 40 if necessary, for example for later evaluation or for use by the components of the device 40. The segmenting device 42, the data fusion circuit 43, the object tracker 44 and the control unit 45 can be implemented as dedicated hardware, for example as integrated circuits. Of course, they can also be partially or completely combined or implemented as software that runs on a suitable processor, for example on a GPU or a CPU. The input 41 and the output 47 can be implemented as separate interfaces or as a combined bidirectional interface.

Figure 5:
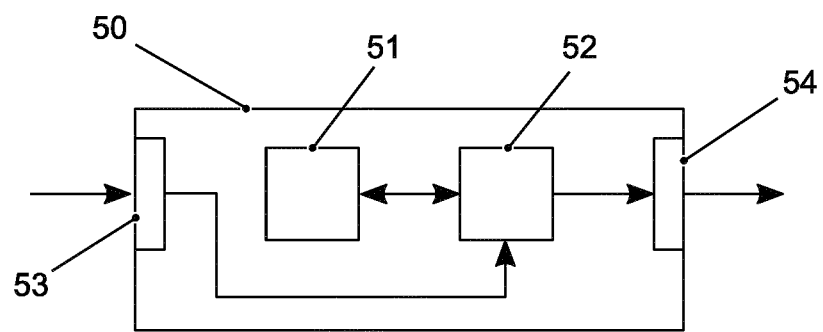
FIG. 5 shows a second embodiment of a device for processing sensor data.

FIG. 5 shows a simplified schematic illustration of a second embodiment of a device 50 for processing sensor data. The device 50 has a processor 52 and a memory 51. For example, the device 50 is a computer or a control device. Instructions are stored in the memory 51 which, when executed by the processor 52, cause the device 50 to carry out the steps according to one of the methods described. The instructions stored in the memory 51 thus embody a program which can be executed by the processor 52 and which implements the method as discussed herein. The device 50 has an input 53 for receiving information, in particular sensor data. Data generated by the processor 52 are provided via an output 54. In addition, they can be stored in memory 51. The input 53 and the output 54 can be combined to form a bidirectional interface.

The processor 52 may include one or more processing units, such as microprocessors, digital signal processors, or combinations thereof.

The memories 46, 51 of the described embodiments can have both volatile and non-volatile storage areas and include a wide variety of storage devices and storage media, for example hard disks, optical storage media or semiconductor memories.

Figure 6:
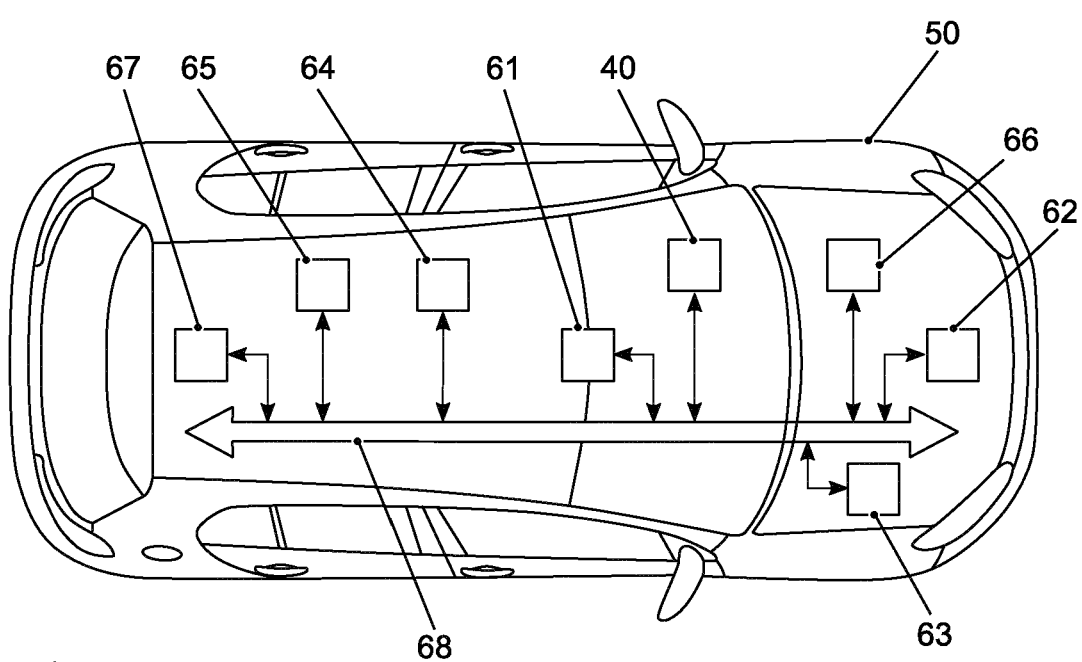
FIG. 6 shows schematically an exemplary motor vehicle in which one solution is implemented.

FIG. 6 schematically shows a motor vehicle 50 in which a solution according to the present teachings is implemented. The motor vehicle 60 has a camera 61 for capturing camera images and a radar sensor 62 for capturing 3D-checkpoints. Furthermore, the motor vehicle 60 has a device 40 for processing sensor data, by means of which the camera images are merged with the 3D-checkpoints to form data of a virtual sensor. Further components of the motor vehicle 60 are ultrasonic sensors 63 and a LIDAR system 64 for capturing the surroundings, a data transmission unit 65 and a number of assistance systems 66, one of which is shown as an example. The assistance systems can use the data provided by the device 20, for example for object tracking. A connection to service providers can be established by means of the data transmission unit 65, for example for retrieving navigation data. A memory 67 is provided for storing data. The data exchange between the various components of the motor vehicle 50 takes place via a network 68.

Further embodiments are to be described below with reference to the FIGS. 7 and 8.

Instead of merging measurement data from different sensors with systematic errors over time in a common model, with association errors easily occurring, the concept of a virtual sensor is introduced. This merges the measurement data from the camera and 3D-sensors on an earlier lever of measurement point and thus abstracts the individual sensors.

Figure 7:
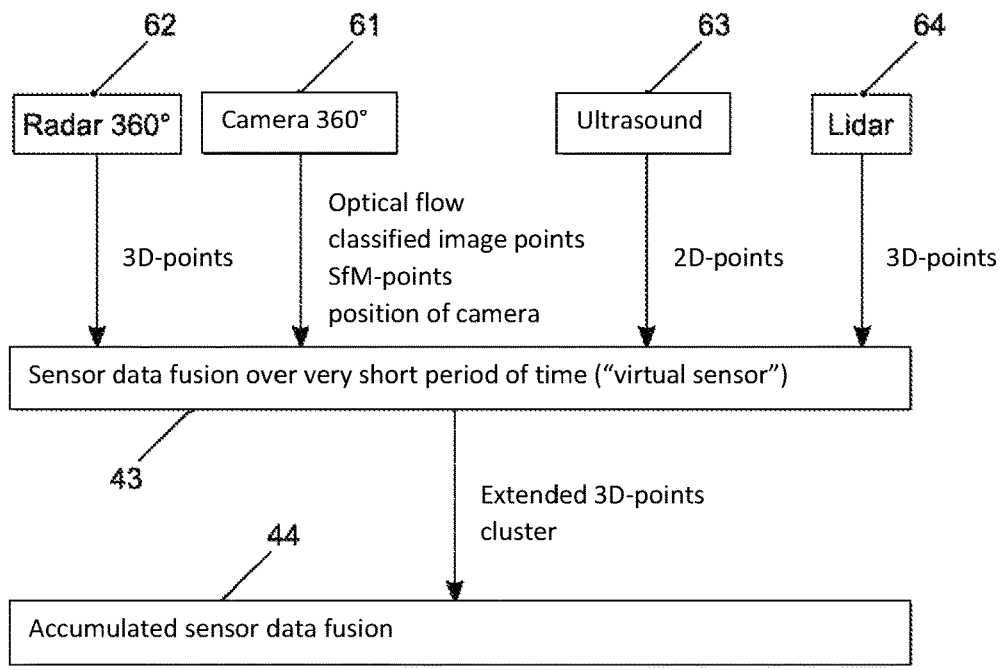
FIG. 7 schematically shows an exemplary concept of a virtual sensor.

FIG. 7 schematically shows the concept of a virtual sensor as basis for an accumulating sensor data fusion. Input variables for the sensor fusion by a data fusion circuit 43 are 3D-checkpoints of a 3D-sensor (radar 62) and camera images from a camera 61. The camera 61 can already process the camera images, for example to determine the optical flow, to classify image points as part of a segmentation or to extract points from the camera images using SfM algorithms (SfM: Structure from Motion). This processing of the camera images can, however, also be carried out by the data fusion circuit 43. Furthermore, the camera 61 can transmit information on the camera position. Further possible data sources are ultrasonic sensors 63 or a LIDAR system 64. The data fusion circuit 43 merges the data over a very short period of time. The 3D-points from the data fusion circuit 42 are then transferred to an accumulating sensor data fusion 44, which enables filtering over time.

A major challenge for the data fusion is that the sensors 61, 62 measure at different times. Precise synchronization of data from the various sensors 61, 62 is therefore necessary. The optical flow determined from the camera images is for example used for the synchronization of the sensors 61, 62. The basics of synchronization will first be explained below. A detailed description of how the various coordinate systems that occur are handled is given below.

The 3D-checkpoints recorded at an instant of in time t are given. At least two camera images are now used, e.g. the camera images before and after the instant of time t of measurement in order to first calculate an optical flow o.

For example, the image is used, which regarding the instant of time of recording t is closest to the instant of time of measurement of the 3D-sensor. Let the difference time between the instant of time when this image was taken and the measurement be $\Delta t$. The optical flow o is measured in the image space (polar space).

A pixel with the position p and the optical flow o is now predicted as follows:

$$p' = p + o \cdot \Delta t \tag{1}$$

Taking into account the time to collision, labeled "TTC", the determination of which is explained below, this formula can be refined:

$$p' = p + \frac{o \cdot \Delta t \cdot TTC}{TTC - \Delta t} \tag{2}$$

With this approach, the entire image can be converted to the measurement time t of the 3D-sensor. Thereafter, the 3D-checkpoints can easily be projected from the depth measuring sensor into the image. For this purpose, the pixels can be treated as infinitely long rays that intersect with the 3D-checkpoints.

With a LIDAR system, however, the scanning effect means that each measuring point has its own time stamp. In this case you can convert the entire image for each measuring point, but this is computationally expensive. An alternative possibility is to search for that pixel with the position p in the original image which satisfies the above equation (1) for the 3D-checkpoint with image coordinates p'.

Various algorithms can be used for this. On the one hand, all optical flow vectors can be rendered using line algorithms in such a way that the bounding box of the vector is specified in each pixel. If several flow vectors overlap in a pixel, the bounding box is enlarged accordingly so that both vectors are contained in the box. The subsequent search algorithm now only has to take into account that bounding box in which the searched pixel must be contained.

Another possibility is to implement search trees, e.g. B. Quadtrees (quaternary trees), similar to the collision detection.

The 3D-checkpoint usually has an angular uncertainty, e.g. by beam expansion. Therefore, all pixels in the vicinity of the uncertainty are for example taken into account in order to add attributes from the image to the 3D-checkpoint. The attributes can be, for example, the averaged optical flow o ($o_x$, $o_y$) or the position in the image space p ($p_x$, $p_y$).

Due to recent advances in image processing using "[Deep] Convolutional Neural Networks (CNN)" ([deep] folded neural networks), pixel-accurate segmentation of images is possible with the appropriate computing power. If at least one of the camera images is segmented by such a neural network, the 3D-checkpoints can also be expanded to include the class(es) resulting from the segmentation and the associated identifier.

The resulting points from the virtual sensor can be clustered into object hypotheses with high quality, as they contain extensive information in order to separate classes. In particular, these are the class information and the identifier from the segmentation, as well as the Cartesian velocity vector, which e.g. is useful with overlapping objects of the same class.

The extended 3D-checkpoints or clusters from the virtual sensor and, respectively, the clusters are then transferred to an accumulating sensor data fusion, which enables filtering over time. With some current neural networks it is possible that these form so-called instances. As an example, there is a row of parking lots with stationary vehicles that are recorded angularly by the camera. Newer methods in such a case can separate the different vehicles despite the overlap in the image. If the neural network forms instances, these can of course be used as cluster information in the accumulating sensor data fusion.

If information on image segments is available through segmentation of the camera images, a complete calculation of the optical flow can possibly be dispensed with. Instead, suitable algorithms can be used to also determine the changes in the individual image segments over time, which in particular can be implemented efficiently.

A time to collision can be determined from the optical flow o in the image space. This time describes when a point penetrates the main plane of the camera optics.

The "TTC" can be calculated with the distance $b=p_1-p_2$ between two points $p_1$, $p_2$ belonging together in the image at two times $t_1$, $t_2$ and, respectively, with the distance at one time and the associated optical flows $o_1$, $o_2$:

$$TTC = (t_2 - t_1) \cdot \frac{b(t_2)}{(b(t_2) - b(t_1))} = \frac{b}{(o_1 - o_2)}. \quad (3)$$

In the following, a pinhole camera model is used for mathematical representation. A Cartesian velocity vector v (in m/s) for the 3D-measurement, which is relative to the ego movement in the camera coordinate system, can be determined from the image position $p_x$, $p_y$ (in pixels), the "TTC" (in s), the optical flow o (in pixels/s) and the distance measurement d in the direction of the image plane of the camera sensor (in m). It should be noted that optical flow o and pixel position p are specified in the image space, while the velocities $v_{x,y,z}$ are determined in the camera coordinate system.

In addition to the measurement attributes, a camera constant "K" is required that takes into account the image distance "b" (in m) and the resolution "D" (pixels per m) of the imaging system. The speeds are then as follows $$v_x = -\frac{d}{TTC} \quad (4)$$

$$v_y = d \cdot \left(o_x - \frac{p_x}{TTC}\right) \cdot K \quad (5)$$

$$v_z = d \cdot \left(o_y - \frac{p_y}{TTC}\right) \cdot K$$

$$K = \frac{1}{(b \cdot D)}$$

If the 3D-checkpoint arises from a radar sensor, the radial relative speed (Doppler speed) can also be used to stabilize the measurement: using this relative speed and distance measurement, an alternative "TTC" can be determined by forming a quotient. This is particularly useful for features near the camera's expansion point, as it is little optical flow there. This affects objects in the driving envelope. However, the driving envelope is usually covered by a particularly large number of sensors, so that the information is usually available.

Figure 8:
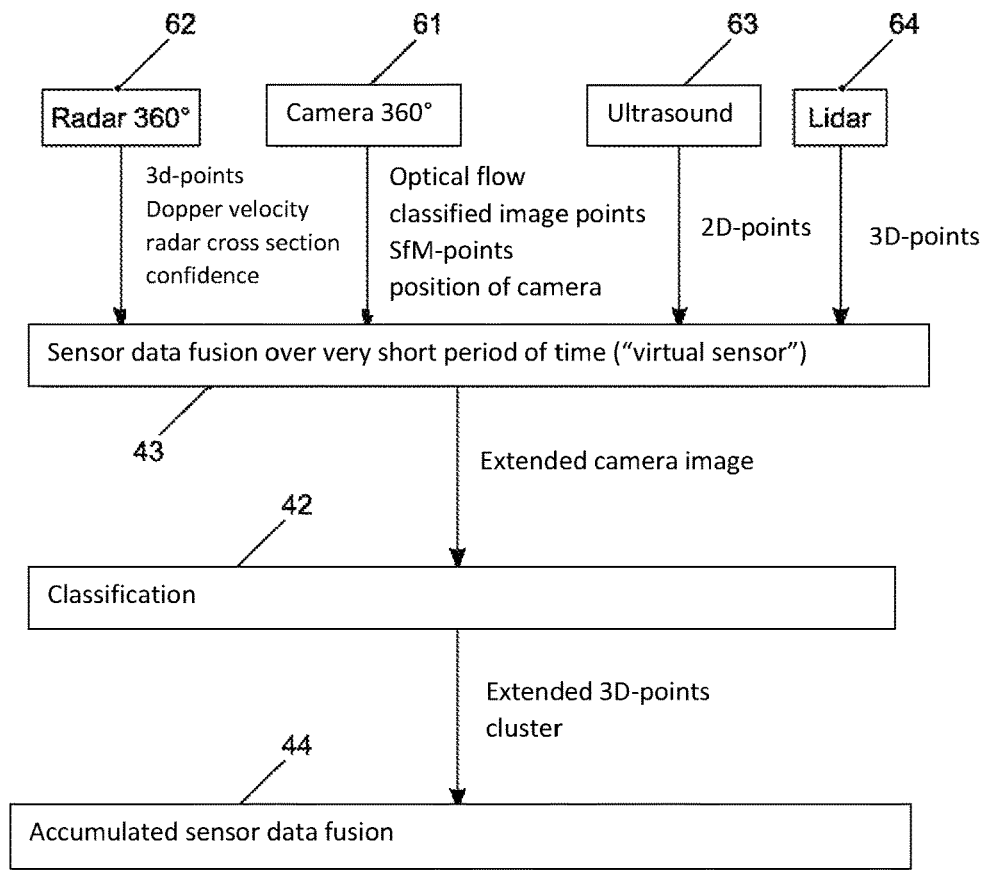
FIG. 8 schematically shows an exemplary concept of a virtual sensor with a classifier.

FIG. 8 schematically shows the concept of a virtual sensor with a classifier. The concept largely corresponds to the concept known from FIG. 7. At present, folded neural networks are often used for image classification. If possible, these require locally associable data that is naturally present in an image. Neighboring pixels often belong to the same object and describe the neighborhood in the polar image space.

However, for example the neural networks not only rely on image data, which hardly supply any data in poor lighting conditions and generally also make it difficult to estimate distances. In other dimensions, measurement data from other sensors, in particular from laser and radar measurements, are therefore projected into the state space. For good performance, it makes sense to synchronize the measurement data using the optical flow so that the neural networks can make good use of the data locality.

The synchronization may be done in the following way. The starting point is a camera image that is as close as possible to all sensor data from the instant of time of recording. In addition to the pixel information, further data is now annotated: In the first step, this includes the shift in the image, for example with help of the optical flow. Using the prediction step already described above, in turn those pixels are identified which, according to the pixel shift, associate with the available 3D-measurement data, for example from laser or radar measurements. Since there are beam expansions during the measurements, several pixels are usually affected here. The associated pixels are expanded by additional dimensions and the measurement attributes are entered accordingly. Possible attributes are, for example: in addition to the distance measurement from laser, radar or ultrasound, the Doppler speed of the radar, the reflectivity or the radar cross-section or even confidence.

The synchronized camera image that has been expanded to include measurement attributes is now classified with a classifier or segmenting device 42, for example with a folded neural network. In this case, all information can now be generated as described above in connection with FIG. 7.

The following is a detailed explanation of the mathematical background that is required for the synchronization of the camera images and the 3D-checkpoints. A camera is assumed that can be modeled as a pinhole camera. This assumption only serves to make the transformations easier to handle. If the camera used cannot be appropriately modeled as a pinhole camera, distortion models can be used instead to generate views that satisfy the pinhole camera model. In these cases, the parameters of the virtual pinhole camera model must be used in the following equations.

First, coordinate systems and the transformations between the coordinate systems must be defined. A total of five coordinate systems are defined:

$C_W$ is the 3D-world coordinate system
$C_V$ is the 3D-coordinate system of the ego vehicle
$C_C$ is the 3D-coordinate system of the camera
$C_S$ is the 3D-coordinate system of the 3D-sensor
$C_I$ is the 2D image coordinate system The coordinate systems of the camera, 3D-sensor, image and ego vehicle are closely linked. Since the ego vehicle moves relative to the world coordinate system, the following four transformations are defined between the coordinate systems:

$T_{V \leftarrow W}(t)$ is the transformation that transforms a 3D-point in the world coordinate system into the 3D-coordinate system of the ego vehicle. This transformation depends on the time t, since the ego vehicle moves over time.

$T_{S \leftarrow V}$ is the transformation that transforms a 3D-point in the 3D-coordinate system of the ego vehicle into the 3D-coordinate system of the 3D-sensor.

$T_{C \leftarrow V}$ is the transformation that transforms a 3D-point in the 3D-coordinate system of the ego vehicle into the 3D-coordinate system of the camera.

$P_{I \leftarrow C}$ is the transformation that projects a 3D-point in the 3D-coordinate system of the camera into the 2D image coordinate system.

A world point moving in the world coordinate system, e.g. a point on a vehicle can be described by $x_w(t)$.

This point is recorded by the camera at an instant of time $t_0$ and by the 3D-sensor at an instant of time $t_1$. The camera observes the associated image point $x_i(t_0)$ in homogeneous coordinates:

$$x_i(t_0) = P_{I \leftarrow C} \cdot T_{C \leftarrow V} \cdot T_{V \leftarrow W}(t_0) \cdot x_w(t_0) \quad (6)$$

The 3D-sensor observes the associated point $x_s$:

$$x_s(t_i) = T_{S \leftarrow V} \cdot T_{V \leftarrow W}(t_i) \cdot x_w(t_1) \quad (7)$$

Equations (6) and (7) are linked to each other by the movement of the ego vehicle and the movement of the world point. While there is information about the movement of the ego vehicle, the movement of the world point is unknown.

It is therefore necessary to obtain information on the movement of the world point.

A second measurement of the camera at a point in time $t_2$ is given:

$$x_i(t_2) = P_{I \leftarrow C} \cdot T_{C \leftarrow V} \cdot T_{V \leftarrow W}(t_2) \cdot x_w(t_2) \quad (8)$$

You can now combine equations (6) and (8) with one another:

$$\Delta x_i(t_0, t_2) = x_i(t_2) - x_i(t_0) \quad (9)$$
$$= P_{I \leftarrow C} \cdot T_{C \leftarrow V} \cdot T_{V \leftarrow W}(t_2) \cdot x_w(t_2) -$$
$$P_{I \leftarrow C} \cdot T_{C \leftarrow V} \cdot T_{V \leftarrow W}(t_0) \cdot x_w(t_0)$$
$$= P_{I \leftarrow C} \cdot T_{C \leftarrow V} \cdot$$
$$(T_{V \leftarrow W}(t_2) \cdot x_w(t_2) - T_{V \leftarrow W}(t_0) \cdot x_w(t_0))$$

In the coordinate system of the ego vehicle, the observed point $x_v(t)$ is given by:

$$x_v(t) = T_{V \leftarrow W}(t) \cdot x_w(t) \quad (10)$$

Applying this to equation (10) one obtains:

$$\Delta x_i(t_0, t_2) = P_{I \leftarrow C} \cdot T_{C \leftarrow V} \cdot \quad (11)$$
$$(T_{V \leftarrow W}(t_2) \cdot x_w(t_2) - T_{V \leftarrow W}(t_0) \cdot x_w(t_0))$$
$$= P_{I \leftarrow C} \cdot T_{C \leftarrow V} \cdot (x_v(t_2) - x_v(t_0))$$
$$= P_{I \leftarrow C} \cdot T_{C \leftarrow V} \cdot \Delta x_v(t_0, t_2)$$

Equation (11) establishes a relationship between the optical flow vector and the motion vector of the world point. $\Delta x_i(t_0, t_2)$ is nothing more than the optical flow vector between the camera images recorded at times $t_0$ and $t_2$ and $\Delta x_v(t_0, t_2)$ is the corresponding motion vector of the world point expressed in $C_V$. The optical flow vector is thus the projection of the motion vector in 3D-space.

The measurements of the camera and the 3D-sensor cannot be combined directly with one another. It must first be introduced as an additional assumption that the movement in the image plane between the times $t_0$ and $t_2$ is linear. Under this assumption, the pixel belonging to a world point is determined by:

$$x_i(t) = \Delta x_i(t_0, t_2) \cdot \frac{t - t_0}{t_2 - t_0} + x_i(t_0) \quad (12)$$

From equation (11) it is clear that both the movement of the world point and the movement of the ego vehicle must be linear.

The transformation from equation (7) in relation to the 3D-sensor can be used to determine a 3D-checkpoint measured in $C_S$ at time $t_1$ in the coordinate system $C_C$ of the camera:

$$x_s(t_1) = T_{S \leftarrow V} \cdot T_{V \leftarrow W}(t_1) \cdot x_w(t_1) \quad (13)$$
$$= T_{S \leftarrow V} \cdot x_v(t_1)$$
$$x_v(t_1) = T_{S \leftarrow V}^{-1} \cdot x_s(t_1)$$

In addition, equation (6) can be used to determine the pixel coordinates of the world point that it would have in a virtual camera image recorded at time $t_1$:

$$x_i(t_1) = P_{I \leftarrow C} \cdot T_{C \leftarrow V} \cdot T_{V \leftarrow W}(t_1) \cdot x_w(t_1) \quad (14)$$
$$= P_{I \leftarrow C} \cdot T_{C \leftarrow V} \cdot x_v(t_1)$$

Applying equation (13) to equation (14), one obtains:

$$x_i(t_1) = P_{I \leftarrow C} \cdot T_{C \leftarrow V} \cdot T_{S \leftarrow V}^{-1} \cdot x_s(t_1) \quad (15)$$

On the other hand, one can determine $x_i(t_1)$ from equation (12):

$$\Delta x_i(t_0, t_2) \cdot \frac{t_1 - t_0}{t_2 - t_0} + x_i(t_0) = x_i(t_1) = P_{I \leftarrow C} \cdot T_{C \leftarrow V} \cdot T_{S \leftarrow V}^{-1} \cdot x_s(t_1) \quad (16)$$

Equation (16) establishes a relationship between the measurements from the camera and the measurements from the 3D-sensor. If the world point is well-defined in world coordinates, the times $t_0$, $t_1$ and $t_2$ as well as the image coordinates in two camera images and the measurement of the 3D-sensor are known, then equation (16) establishes a complete relationship, i.e. there are no unknown quantities.

This fact can be used even if the correct correspondence between measurements of the 3D-sensor and the camera is not known. If there is a measurement of the 3D-sensor at time $t_1$, it can be transformed into a virtual camera image, i.e. the camera image that the camera would capture at time $t_1$. The virtual pixel coordinates for this are $x_i(t_1)$. Using the optical flow vector $v_i(t_0,t_2)$ one can now search for the pixel $x_i(t_0)$ for which $v_i(t_0, t_2) \cdot t_1-t_0/t_2-t_0+x_i(t_0)$ is equal to or at least very close to $x_i(t_1)$.

LIST OF REFERENCE NUMERALS

10 Associating a measurement with a track
11 Checking the association for success
12 Updating the corresponding track
13 Initializing a new track
14 Checking the last updated time of a track
15 Erasing a track
16 Predicting the tracks for the next instant of time of measurement
17 Transforming the track states into the measurement room
20 Acquiring camera images
21 Acquiring 3D-checkpoints
22 Segmenting at least one camera image
23 Merging the camera images with the 3D-checkpoints
24 Outputting of data from a virtual sensor
30 Computing an optical flow
31 Determining a time to collision
32 Determining of pixels that are assigned to one of the 3D-checkpoints
40 Device
41 Input
42 Segmenting Device
43 Data Fusion circuit
44 Object tracker
45 Control Unit
46 Memory
47 Output
48 User Interface
50 Device
51 Memory
52 Processor
53 Input
54 Output
60 Motor Vehicle
61 Camera
62 Radar Sensor
63 Ultrasonic Sensor
64 LIDAR System
65 Data Transfer Unit
66 Assistance System
67 Memory
68 Network
A Object List
E Sensor Data
FL Optical Flow
I1, I2 Camera Image
MP Measuring Point
TTC Time to Collision
VS Data from a Virtual Sensor The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. Method for processing sensor data, comprising:
    obtaining camera images by a camera including a first camera image captured at a first time and a second image captured at a second time;
    detecting 3D-checkpoints by at least one 3D-sensor at a 3D-checkpoint detection time after the first time of the first camera image and before the second time of the second camera image; and
    fusing the camera images with the 3D-checkpoints to form data of a virtual sensor, wherein fusing the camera images with the 3D-checkpoints comprises:
        calculating an optical flow from at least the first camera image and the second camera image;
        selecting either the first camera image or the second camera image based on whether the 3D-checkpoint detection time is closer in time to the first time of the first camera image or the second time of the second camera image;
        converting the selected first or second camera image to the 3D-checkpoint detection time based at least on the optical flow and a time difference between the respective first time or second time of the selected first or second camera image and the 3D-checkpoint detection time; and
        projecting the 3D-checkpoints into the converted selected first or second selected camera image.

2. The method of claim 1, wherein determining in at least one of the camera images pixels to be assigned to one of the 3D-checkpoints at an instant of time of the measurement comprises:
    determining, on the basis of the optical flow and a search method, those pixels in the camera image which are to be assigned to the 3D-checkpoints at the instant of time of the measurement; and
    projecting the 3D-checkpoints at the points determined in this way in the camera image.

3. The method of claim 2, wherein from the optical flow a time to collision is determined for the pixels of the camera images and wherein a velocity vector for this 3D-checkpoint is calculated from the time to collision, the optical flow, and a distance measurement for a 3D-checkpoint.

4. The method of claim 2, wherein the 3D-checkpoints are expanded to include attributes from at least one of the camera images.

5. The method of claim 1, wherein from the optical flow a time to collision is determined for the pixels of the camera images and wherein a velocity vector for this 3D-checkpoint is calculated from the time to collision, the optical flow, and a distance measurement for a 3D-checkpoint.

6. The method of claim 5, wherein the time to collision is determined from a measurement by the 3D-sensor instead of from the optical flow.

7. The method of claim 1, wherein the 3D-checkpoints are expanded to include attributes from at least one of the camera images.

8. The method of claim 1, wherein at least one camera image is segmented near an instant of time of measurement of the 3D-sensor.

9. The method of claim 8, wherein segmenting besides image information also considers measurements of the 3D-sensor.

10. The method of claim 1, wherein an algorithm for object tracking is applied to the data of the virtual sensor.

11. The method of claim 10, wherein the algorithm for object tracking performs an accumulating sensor data fusion.

12. A non-transitory computer-readable storage medium with instructions which, when executed by a computer, cause the computer to carry out the method of claim 1 for processing sensor data.

13. Motor vehicle, wherein the motor vehicle is configured to carry out the method of claim 1 for processing sensor data.

14. A device for processing sensor data, comprising:
an input for receiving camera images from a camera and 3D-checkpoints from a 3D-sensor, wherein the camera images include a first camera image captured at a first time and a second image captured at a second time, and wherein the 3D-checkpointsare detected at a 3D-checkpoint detection time after the first time of the first camera image and before the second time of the second camera image; and
a data fusion circuit for fusing the camera images with the 3D-checkpoints to form data of a virtual sensor;
wherein the data fusion circuit is further configured to:
calculate an optical flow from at least the first camera image and the second camera image;
select either the first camera image or the second camera image based on whether the 3D-checkpoint detection time is closer in time to the first time of the first camera image or the second time of the second camera image;
convert the selected first or second camera image to the 3D-checkpoint detection time based at least on the optical flow and a time difference between the respective first time or second time of the selected first or second camera image and the 3D-checkpoint detection time; and
project the 3D-checkpoints into the converted selected first or second selected camera image.

15. A motor vehicle, wherein the motor vehicle comprises the device of claim 14.

16. The device of claim 14, wherein from the optical flow a time to collision is determined for the pixels of the camera images and wherein a velocity vector for this 3D-checkpoint is calculated from the time to collision, the optical flow, and a distance measurement for a 3D-checkpoint.

17. The device of claim 13, wherein the 3D-checkpoints are expanded to include attributes from at least one of the camera images.

* * * * *